(12) United States Patent
Ernst et al.

(10) Patent No.: US 12,529,128 B2
(45) Date of Patent: Jan. 20, 2026

(54) METHOD FOR PRODUCING THERMO-MECHANICALLY PRODUCED HOT-ROLLED STRIP PRODUCTS

(71) Applicant: voestalpine Stahl GmbH, Linz (AT)

(72) Inventors: Wolfgang Ernst, Linz (AT); Helmut Spindler, Oed-Öhling (AT)

(73) Assignee: voestalpine Stahl GmbH, Linz (AT)

( * ) Notice: Subject to any disclaimer, the term of this patent is extended or adjusted under 35 U.S.C. 154(b) by 958 days.

(21) Appl. No.: 17/413,187

(22) PCT Filed: Dec. 18, 2019

(86) PCT No.: PCT/EP2019/086058
§ 371 (c)(1),
(2) Date: Jun. 11, 2021

(87) PCT Pub. No.: WO2020/127557
PCT Pub. Date: Jun. 25, 2020

(65) Prior Publication Data
US 2022/0018008 A1      Jan. 20, 2022

(30) Foreign Application Priority Data

Dec. 19, 2018   (DE) ..................... 10 2018 132 908.3

(51) Int. Cl.
*C22C 38/58*   (2006.01)
*B23K 35/30*   (2006.01)
(Continued)

(52) U.S. Cl.
CPC .......... *C22C 38/58* (2013.01); *B23K 35/3073* (2013.01); *C21D 8/0205* (2013.01);
(Continued)

(58) Field of Classification Search
None
See application file for complete search history.

(56) References Cited

U.S. PATENT DOCUMENTS

2012/0205016 A1   8/2012   Arai et al.
2014/0299237 A1   10/2014  Somani et al.
(Continued)

FOREIGN PATENT DOCUMENTS

DE   3616518    5/1986
DE    298825    4/1990
(Continued)

OTHER PUBLICATIONS

English language machine translation of JP 2006183139. Generated Aug. 20, 2024. (Year: 2024).*

(Continued)

*Primary Examiner* — Sally A Merkling
*Assistant Examiner* — Brian D Walck
(74) *Attorney, Agent, or Firm* — Maxwell J. Petersen; FisherBroyles, LLP

(57) ABSTRACT

The invention relates to a method for producing thermomechanically produced hot strip products in which a steel alloy is melted; the steel alloy is adjusted so that a recrystallization during the hot rolling is suppressed; the final rolling temperature is greater than 800° C.; the melted steel alloy is cast into slab ingots and after being heated to a temperature above $Ac_3$, the slab ingots are hot rolled until they reach a desired degree of deformation and a desired strip thickness; after the rolling, the strip is cooled to room temperature and for hardening purposes, is briefly heated to a temperature >Ac3 and cooled again, characterized in that the heating takes place with a temperature increase of more than 5 K/s, more than 10 K/s, more than 50 K/s, or more than 100 K/s, and is kept at a desired target temperature for a period of 0.5 to 60 s before cooling to yield improved mechanical properties.

19 Claims, 10 Drawing Sheets

(51) Int. Cl.

| | |
|---|---|
| *B23K 103/04* | (2006.01) |
| *C21D 8/02* | (2006.01) |
| *C21D 9/50* | (2006.01) |
| *C21D 9/52* | (2006.01) |
| *C22C 38/00* | (2006.01) |
| *C22C 38/02* | (2006.01) |
| *C22C 38/06* | (2006.01) |
| *C22C 38/42* | (2006.01) |
| *C22C 38/44* | (2006.01) |
| *C22C 38/48* | (2006.01) |
| *C22C 38/50* | (2006.01) |
| *C22C 38/54* | (2006.01) |

(52) U.S. Cl.
CPC .......... *C21D 9/50* (2013.01); *C21D 9/52* (2013.01); *C22C 38/002* (2013.01); *C22C 38/02* (2013.01); *C22C 38/06* (2013.01); *C22C 38/42* (2013.01); *C22C 38/44* (2013.01); *C22C 38/48* (2013.01); *C22C 38/50* (2013.01); *C22C 38/54* (2013.01); *B23K 2103/04* (2018.08)

(56) References Cited

U.S. PATENT DOCUMENTS

| | | | |
|---|---|---|---|
| 2015/0101712 A1 | 4/2015 | Futamura et al. | |
| 2017/0130292 A1 | 5/2017 | Mohanty et al. | |
| 2022/0010404 A1 | 1/2022 | Ernst et al. | |
| 2022/0145414 A1 | 5/2022 | Ernst et al. | |
| 2023/0357877 A1 | 11/2023 | Ernst et al. | |

FOREIGN PATENT DOCUMENTS

| | | |
|---|---|---|
| DE | 4033700 | 10/1990 |
| DE | 19546204 | 11/1995 |
| DE | 19637968 | 8/1996 |
| EP | 1375694 A1 | 1/2004 |
| EP | 2239343 | 10/2010 |
| EP | 2757170 | 7/2014 |
| JP | 2006183139 | 7/2006 |
| JP | 2018021233 | 2/2018 |
| WO | 2011079341 | 7/2011 |
| WO | 2017021459 | 2/2017 |
| WO | 2018220598 | 6/2018 |

OTHER PUBLICATIONS

Thomas Schlagradl et al, "Investigation of the hardnened-toughness relationship of a welded joint after different heat treatment cycles," Welding in the World, Springer, vol. 57, No. 1. Jan. 1, 2013, pp. 113-121.

Hoheok Kim et al., "Prediction of Ac3 and Martensite Start Temperatures by a Data-Driven Model Selection Approach," ISJ International, JP, vol. 57, No. 12, Jan. 1, 2017, pp. 2229-2236.

International Search Report and Written Opinion for PCT/EP2019/086058.

Office Action dated Aug. 29, 2019 in German Application DE 10 2018 132 908.3.

International Search Report and Written Opinion for PCT/EP2019/086059.

Martin Klein et al, "Ultra High Strength Steel Produced By Thermomechanical Hot Rolling—Advanced Properties And Applications," Materials Development, R&D Department, voestalpine Stahl GmbH, Springer-Verlag, vol. 157, No. 3, Mar. 1, 2012, pp. 108-112.

Office Action dated Aug. 27, 2019 in German Application DE 10 2018 132 901.6.

International Search Report and Written Opinion for PCT/EP2019/086052.

Office Action dated Sep. 17, 2019 in German Application DE 10 2018 132 816.8.

International Search Report and Written Opinion for PCT/EP2019/086062.

Office Action dated Aug. 27, 2019 in German Application DE 10 2018 132 860.5.

Klein et al., "Ultra High Strength Steels Produced By Thermomechanical Hot Rolling—Advanced Properties and Applications," BHM (2012), vol. 157(3): 108-112.

* cited by examiner

Recrystallized, globular austenite:

Non-recrystallized, elongated austenite:

| | | | | |
|---|---|---|---|---|
| Prior art | TM + (DQ) + H + A |  |   | Slab |
| | TM + DQ + A |  |  | Slab<br>Strip |
| Invention | TM/[TM + DQ] + (A) + H$_{ST}$/[H$_{ST}$ + A$_{ST}$] |  |  | Strip<br>Slab<br>Sheet bar<br>Profile<br>Tube |

Reference treatment route TM + (DQ) + H + A

Reference treatment routes TM + DQ + A

Ex.: Fusion-welded connection, also valid for pressure-welded connections

METHOD FOR PRODUCING THERMO-MECHANICALLY PRODUCED HOT-ROLLED STRIP PRODUCTS

RELATED APPLICATIONS

This patent application is a 35 U.S.C. § 371 National Stage entry based on and claiming priority to International Application PCT/EP2019/086058, filed on Dec. 18, 2019, which in turn claims priority based on German Application DE 10 2018 132 908.3, filed on Dec. 19, 2018, the disclosures of which are incorporated herein by reference in their entireties.

FIELD OF THE INVENTION

The invention relates to a method for producing thermomechanically produced hot-rolled strip (herein "hot strip") products according to the description and claims herein.

BACKGROUND OF THE INVENTION

The term "hot strip" refers to a hot-rolled steel strip which is produced in that first, a steel melt of a desired alloy along with inevitable impurities that are intrinsic to the steel melting process is melted, generally in a converter. The melt is usually then fed into a metallurgical ladle in which a melt metallurgical processing, in particular an alloy adjustment, takes place. A wide variety of oxidizing processes are also carried out in the converter in order to reduce the quantity of unwanted by-elements.

Then the steel is poured from the ladle usually via a tundish into a continuous casting machine in which the liquid steel is cast into a theoretically endless strip of slab ingots. In the continuous casting machine, the solidified steel strip is cut into so-called slab ingots, which are slab-shaped, with a thickness of several decimeters, a width of for example 1.5 m, and a length of for example 6 m to 12 m.

Such slab ingots can then be further processed in rolling trains.

To produce a hot strip, such slab ingots are first preheated to the rolling temperature in a reheating furnace and then travel into the so-called hot (wide) strip mill.

The hot strip mill consists of a series of rolling stands; first, there is a so-called reversing roughing mill in which the slab ingot is rough-rolled. The still very hot, brightly glowing steel strip is then fed into the actual rolling stands and passes through these rolling stands, which give the strip a target thickness and target width.

Hot strips of this kind, after they have been coiled, can either undergo further processing immediately or they can be processed into steel sheet by means of a cold-rolling train.

Hot strip, however, is not only produced strictly for processing into steel sheet, but also represents its own steel specialty product, which can undergo immediate processing with modifications.

The term "thermomechanical steel" refers to a microalloyed steel material, which is produced by means of a thermomechanical process. In the thermomechanical rolling process, a final temperature is kept within a defined range. This achieves material properties of the steel that cannot be achieved by heat treatment alone. This procedure is not repeatable. Thermomechanical steels have high strengths and toughnesses, have very good processability, and in particular, have a very good weldability.

Thermomechanical rolling is a process in which particular usage properties of the steel, namely the strength and toughness as a rule, are improved through the combination of thermal impact and plastic deformation. There are various methods that include a thermal treatment followed by a forming; the forming is different at high and low temperatures. There are also methods in which the forming is carried at a defined temperature first, followed by a thermal treatment. In thermally treated steels micro-alloying elements are often added. During the hot forming, these should precipitate out as carbides and nitrides in order to inhibit recrystallization. By means of a grain change, this results in better mechanical properties. The tendency of titanium to form high-temperature stable nitrides is also used to inhibit grain growth during the austenite formation. Finally, the precipitation that forms later during the cooling also contributes to a particle hardening.

In normal thermomechanical hot-rolling procedures, the austenite is deformed in a temperature range slightly above $A_3$ (iron-carbon diagram).

The austenite form hardening takes place, depending on the specific steel, at about 500° C. below the recrystallization temperature in the austenite. After a transformation, this becomes extremely fine-needled martensite. In the thermomechanical rolling, during the forming, for example in the pearlite stage, the strength is increased by means of a refining of the microstructure and possibly by means of a precipitation hardening.

By means of thermomechanical rolling below 800° C., micro-alloyed fine-grained structural steels are forced to undergo a transformation of the non-crystallized austenite into an extremely fine-grained ferrite-pearlite structure. By means of a subsequent accelerated cooling, it is even possible to enable the transformation into bainite or martensite, which results in a further increase in strength.

WO2017/016582 A1 has disclosed a high-strength steel with a high minimum yield strength and a method for producing a steel of this kind. This steel has a composition that comprises the following:

(a) carbon: 0.23 to 0.25 wt %
(b) silicon: 0.15 to 0.35 wt %
(c) manganese: 0.85 to 1.00 wt %
(d) aluminum: 0.07 to 0.10 wt %
(e) chromium: 0.65 to 0.75 wt %
(f) niobium: 0.02 to 0.03 wt %
(g) molybdenum: 0.55 to 0.65 wt %
(h) vanadium: 0.035 to 0.05 wt %;
(i) nickel: 1.10 to 1.30 wt %;
(j) boron: 0.0020 to 0.0035 wt %;
(k) calcium: 0.0007 to 0.0030 wt %; and the steel possibly contains other elements, with the maximum concentration of the other elements being:
(l) phosphorus: <0.012 wt % and/or
(m) sulfur: <0.003 wt % and/or
(n) copper: <0.10 wt % and/or
(o) nitrogen: <0.006 wt % and/or
(p) titanium: <0.008 wt % and/or
(q) tin: <0.03 wt % and/or
(r) hydrogen: <2.00 ppm and/or
(s) arsenic: <0.01 wt % and/or
(t) cobalt: <0.01 wt %; the rest comprising iron and inevitable impurities; and
(i) the carbon equivalent Pcm can be calculated as follows $$Pcm=[C]+[Si]/30+[Mn]/20+[Cu]/20+[Ni]/60+[Cr]/20+[Mo]/15+[V]/10+5[B];$$

where [C], [Si], [Mn], [Cu], [Ni], [Cr], [Mo], [V], and [B] are the mass fractions of the respective elements in the high-strength steel in wt % and where for Pcm the following relation applies:

0.38 wt %<$Pcm$<0.44 wt %; and/or (ii) the carbon equivalent Ceq can be calculated as follows $Ceq$=[C]+[Si]/24+[Mn]/6+[Ni]/40+[Cr]/5+[Mo]/4+ [V]/14;

where [C], [Si], [Mn], [Ni], [Cr], [Mo] and [V] are the mass fractions of the respective elements in the high-strength steel in wt % and where for Ceq, the following relation applies:

0.675<$Ceq$<0.78 wt %; and/or (iii) the carbon equivalent CET can be calculated as follows $CET$=[C]+([Mn]+[Mo])/10+([Cr]+[Cu])/20+[Ni]/40 where [C], [Mn], [Cr], [Mo], [Cu] and [Ni] are the mass fractions of the respective elements in the high-strength steel in wt % and where for CET, the following relation applies:

0.43 wt %<$CET$<0.49 wt %.

During production, the hydrogen content is reduced by means of a vacuum treatment of the steel melt after which the steel melt is cast into a slab ingot. The slab ingot is then heated to a temperature in the range from 1100° C. to 1250°, descaled, and then hot rolled into a flat steel product. The product is then coiled; the coiling temperature is at least 800° C.; during the hot rolling of the slab ingot into a flat steel product, the initial rolling temperature is in the range from 1050° C. to 1250° C. and the final rolling temperature is 880° C.; and for the Pcm, the following relation applies: 0.38 wt %<Pcm 0.44 wt %. After the hot rolling, the flat steel product preferably is subjected to a hardening treatment; the hardening treatment is performed at a temperature of at least 40 Kelvin above the Ac3 temperature of the steel alloy and the flat steel product is then quickly quenched to a temperature below 200° C. so that the cooling speed is at least 25 K/s. The minimum austenitization temperature of the flat steel product according to WO2017/016582 A1 for the uniform austenitization is 860° C. Lower austenitization temperatures<860° in combination with the balanced chemical composition of this steel alloy result in an partial austenitization, which is not wanted [sic]. Preferably, the austenitization temperature should be 920° C.; higher temperatures promote austenite grain growth, which results in a reduction in the mechanical/technological properties. The optimal austenitization temperature should be 880° C.

EP 2 267 177 A1 discloses a high-strength steel plate, which is used as a structural element in industrial machines and which on the one hand, should have an outstanding resistance to a delayed fracture and on the other, should have a good welding behavior. This steel plate has a minimum yield strength of 1300 MPa or greater and a tensile strength of 1400 MPa or greater. The thickness of this steel plate should be greater than or equal to 4.5 mm and less than or equal to 25 mm.

EP 2 789 699 A1 has disclosed a high-strength, hot-rolled steel product and a method for producing it. The method includes the steps of melting a steel with the following composition: C 0.25 to 0.45%, Si 0.01 to 1.5%, Mn 0.4 to 3.0%, Ni 0.5 to 4%, Al 0.01 to 1.2%, Cr<2%, Mo<1%, Cu<1.5%, V<0.5%, Nb<0.2%, Ti<0.2%, B<0.01%, Ca<0.01%, with the remainder being comprised of iron and inevitable impurities; the steel melt is cast into a slab ingot and the slab ingot is heated to a temperature in the range from 950 to 1350° C., followed by a heat compensation step; the slab ingot is then hot-rolled in a temperature range from Ar3 to 1300° C. and then immediately cooled; the cooling temperature is below the Ms-temperature and the austenite grain structure of the steel product is elongated in the rolling direction so that the length-to-width ratio is 1.2.

US 2007/0272333 A1 has disclosed a hot-rolled product, which should have a high strength; the steel has a composition comprising 0.03 to 0.1% carbon, 0.2 to 2% silicon, 0.5 to 2.5% manganese, 0.02 to 0.1% aluminum, 0.2 to 1.5% chromium, and 0.1 to 0.5% molybdenum; with 80% by area having a martensitic structure, at least in the longitudinal direction.

EP 2 340 897 A1 has disclosed a thermomechanical processing method for heavy plates. This method serves to increase the toughness, in particular the low-temperature toughness. For the production, the heavy plate is heated, partially and completely formed by means of rolling, and then is subjected to an accelerated cooling as compared to a cooling at ambient temperature; the heavy plate, which has been heated to a temperature above the $A_{c3}$ temperature for a partial forming, is subjected to an accelerated cooling after its final forming. In order to achieve exceptional toughness values, between the partial forming and the final forming, the heavy plate is subjected to an accelerated cooling to a temperature below the ar3 temperature and then is inductively heated to a temperature above the $A_{c3}$ temperature.

CA 2 845 471 has disclosed a coiled steel tube, which is produced from a plurality of welded strips, wherein the tube comprises base metal regions, weld joints, and heat affected zones, and has a tensile strength of greater than 80 ksi; in addition to iron, it can contain 0.17 to 0.35 wt % carbon, 0.3 to 2 wt % manganese, 0.1 to 0.3 wt % silicon, 0.01 to 0.04 wt % aluminum, up to 0.01% sulfur, and up to 0.015 wt % phosphorus, and the microstructure comprises more than 90% by volume of tempered martensite, wherein the microstructure should be homogeneous across all regions, namely the base metal regions, weld joints, and heat affected zones, and wherein the microstructure should comprise a uniform distribution of carbides. In addition, the composition can comprise up to 1 wt % chromium, 0.5 wt % molybdenum, 0.003 wt % boron, up to 0.03 wt % titanium, up to 0.5 wt % copper, up to 0.5 wt % nickel, up to 0.1 wt % niobium, up to 0.15 wt % vanadium, and up to 0.05 wt % calcium, with a maximum oxygen content of up to 0.0050 wt %.

JP 2006 183139 A has disclosed an automobile part, which is made out of a steel alloy that contains fine carbides. The fine precipitation of V-containing carbides in steel produces a particle size of 20 nm or less. The steel alloy contains C: 0.10 to 0.25%, Si: 1.5% or less, Mn: 1.0 to 3.0%, P: 0.10% or less, S: 0.005% or less, Al: 0.01 to 0.5%, N: 0.010% or less. It contains 0.10 to 1.0% V and satisfies the formula (10Mn+V)/C≥50. The rest consists of Fe and inevitable impurities, with the volumetric fraction of the tempered martensite phase amounting to 80% or more.

US 2015 01017712 A1 has disclosed a high-strength cold rolled steel; the steel is kept for at least 50 s at a temperature at or above the ac3 point, then it is cooled to an arbitrary temperature between 300° C. and 400° C. at an average cooling speed of at least 15 K/s, is kept for 5 to 180 s in a temperature range between 400° C. and 540° C., is kept in this temperature range for at least 50 s, and is then cooled. The steel has a tensile strength of at least 980 MPa.

JP 2018 021233 A has disclosed a high-strength steel sheet in which the steel has the following alloy composition:

C 0.15% to 0.35%, Si+Al 0.5% to 3.0%, Mn 1.0% to 4.0%, P 0.05% or less and S 0.01% or less, with the rest made up of Fe and inevitable impurities. The steel structure contains a ferrite fraction of 5% or less, the total fraction of tempered martensite and tempered bainite is 60% or more, and the quantity of residual austenite amounts to 10% or more. MA has an average size of 1.0 µm or less. The quantity of residual austenite is 0.3% or more.

EP 2239343 A1 has disclosed a method for producing a hollow body. In particular, an electric resistance-welded steel pipe, which is made of a steel sheet and in which the width of a low-carbon layer is [sic], is subjected to a heat treatment that includes a quenching treatment. In the quenching treatment, the electric resistance-welded steel pipe is heated to a heating temperature, which is not lower than the Ac3 transformation temperature, is kept there for a soaking time, immediately cooled to a quenching start temperature at a primary cooling rate, and then secondarily cooled (quenched). The quenching start temperature is higher than the Ar3 transformation temperature. This prevents the hardness from being reduced during the quenching of the electric resistance-welded steel part and increases the durability of the heat treated article.

"Investigation of the hardness-toughness relationship" by Th. Schlagradl et al. is an investigation into the relationship between hardness and toughness with various forms of heat treatment. A steel wire made of T 69 5 ZMn2NiCrMo M M1 H5 is used for the investigation. The influence of the cooling time and the holding time on the ratio of hardness to toughness is investigated. The cooling time from 1350° C. to 20° C. and the holding time with an annealing temperature of 580° C. are compared. A slow cooling within 20 s promotes toughness whereas a long holding time reduces the toughness.

"Ultra High Strength Steels Produced by Thermomechanical Hot Rolling—Advanced Properties and Applications" by M. Klein et al. discloses an advantageous combination of thermomechanical rolling and subsequent martensitic transformation. It is described as a suitable method for obtaining ultra-high-strength hot rolled material with a balanced ductility and toughness. With this method for producing strips, it is possible to achieve yield strengths of 900 MPa to 1100 MPa with very low carbon concentrations of between 0.08 and 0.17 m %.

All in all, the prior art has disclosed hot rolled ultra-high-strength or wear-resistant steels for all possible forms of use, which have a high strength accompanied by a high toughness and a good processability. In this connection, products such as wide strip sheets and slab products are supplied; in particular, these are produced in wide strip mills. The rolling processes used include conventional hot rolling (HR) and thermomechanical rolling (TM). Hot strips of this kind, produced with the conventional hot rolling methods or with the thermomechanical rolling method, are produced either by slow cooling or quenching and direct hardening (DQ) after rolling.

Pipes or profiles can also be produced using the rolling method; this is done using either seamless pipe-rolling mills or so-called roll profiling mills. The forming methods used in this connection are conventional hot rolling, thermomechanical rolling, and roll profiling. Pipes of this kind also involve a subsequent heat treatment; this heat treatment is either a conventional hardening, i.e. a pipe hardening, [sic] a conventional quenching and tempering, i.e. a pipe quenching and tempering and local weld seam finishing treatment after welding procedures; it is not unknown to use inductive heat treatments for normalizing the hardening and the quenching and tempering.

Strips, sheets, and slab products also involve performing a subsequent heat treatment; this, too, is either a conventional hardening, e.g. slab hardening, or a conventional quenching and tempering, e.g. slab quenching and tempering; the annealing can also be performed as a slab annealing or bell annealing. Here, too, a wide variety of welding processes are performed; local weld seam finishing treatments are customary.

In the previous methods for heat treatment of such steel grades and steel products, problems arise. Basically, conventional hardening or quenching and tempering can only be performed with piece goods. These are sheets that have been cut to size or pipes or profiles that have been cut to length. Basically, this is quite laborious and therefore also costintensive. Such conventionally hardened products frequently have higher alloying concentrations, in particular C concentrations, which have a negative effect on the weldability.

Furthermore, it is a known problem that welded products have non-homogeneous properties in the vicinity of the weld seam due to the heat affected zones.

SUMMARY OF THE INVENTION

Hot strip products as defined by the application are assumed to usually have a sheet thickness of 1.5 to 20 mm, in particular 3 to 15 mm.

The object of the invention is to establish a method for producing thermomechanically produced hot strip products, which in comparison to conventionally produced thermomechanical hot strip products, have outstanding strength and toughness combinations and a fine isotropic structure.

The object is attained with a method for producing thermomechanically produced hot strip products with the features described and claimed herein.

Advantageous modifications are also described and claimed herein.

All percentage indications throughout the following description are expressed in percentage by weight unless otherwise indicated.

In thermomechanically (TM) rolling, a significant part of the forming takes place below the recrystallization stop temperature, as a result of which the austenite is elongated, as shown in FIGS. 2 and 3. In comparison to conventional hot rolling, after the TM rolling, there is a finer final structure with a greater dislocation density. The finer grain and increased dislocation density produce an increase in the strength. The finer grain structure simultaneously also produces an increase in the toughness.

Consequently, TM rolling can increase the strength with the same alloy composition or can achieve savings on alloying components with the same strength level. The reduction of the alloying components, in particular carbon, results in an improvement in the weldability.

The hot strip product according to the invention has a predominantly martensitic structure, which is generated from globular, fine austenite grains and therefore has homogeneous isotropic properties. This also applies to weld seams that are present. To achieve this, a hot strip is produced by means of thermomechanical rolling and direct hardening so that an elongated austenite grain with a homogeneous carbon distribution is transformed into a predominantly martensitic structure.

According to the invention, however, the heat treatment is performed as a short-term heat treatment in deviation to the state of the art. In this connection, the short-term heat treatment according to the invention can be an inductive hardening or an inductive quenching and tempering (hardening and annealing). The short-term heat treatment, however, can be carried out with all forms of heating that enable a short-term, preferably rapid heating; hardening is performed at least once and the annealing is optional. For it, a globular, fine austenite grain is achieved, which after its transformation into predominantly martensitic structure has maximum strength and toughness values.

According to the invention, a "short-term heat treatment" is understood, for example, to mean a hardening, which is performed once or multiple times; the heating rates are up to 1000 K/s depending on the cross-section of the product to be heated; this heating rate can decrease with increasing cross-section. The maximum temperature in this case is above $A_{c3}$, in other words, 800° C. to 1000° C., in particular 820° C. to 970° C. The holding time for which the maximum temperature is maintained is 0.5 to 60 seconds; finally, a cooling is performed in which the cooling rates are between 10 Kelvin/sec and up to greater than 60 Kelvin/sec.

An optional annealing is performed at temperatures below $A_{c1}$, with the temperatures particularly lying between 300° C. and 700° C.

To improve the weld seam properties, an annealing temperature of between 500° C. and 700° C. can be advantageous, but in order to increase the yield strength, a lower annealing temperature of 300° C. to 450° C. can be particularly advantageous.

For the method according to the invention, it is particularly suitable to use a steel that has the following composition (all values in wt %):
- 0.03 to 0.22% carbon,
- 0.0 to 2.0% silicon,
- 0.5 to 3.0% manganese,
- 0.02 to 1.2% aluminum,
- 0 to 2.0% chromium,
- 0 to 2.0% nickel,
- 0.0 to 1.0% molybdenum,
- 0.0 to 1.5% copper,
- 0 to 0.02% phosphorus,
- 0 to 0.01% sulfur,
- 0 to 0.008% nitrogen,
- 0 to 0.005% boron,
- 0.0 to 0.2% niobium,
- 0.0 to 0.3% titanium,
- 0.0 to 0.5% vanadium
- the remainder being comprised of iron and smelting-related impurities, The following alloy composition is particularly suitable (all values in wt %):
- 0.055 to 0.195 carbon,
- 0.0 to 0.3% silicon,
- 1.4 to 2.3% manganese,
- 0.02 to 0.6% aluminum,
- 0 to 2% chromium,
- 0 to 2% nickel,
- 0.0 to 0.42% molybdenum,
- 0.0 to 0.5% copper,
- 0 to 0.008% phosphorus,
- 0 to 0.0015% sulfur,
- 0 to 0.007% nitrogen
- 0 to 0.005% boron,
- 0.0 to 0.2% niobium,
- 0.0 to 0.3% titanium,
- 0.0 to 0.5% vanadium
- the remainder being comprised of iron and smelting-related impurities, With the invention, it is advantageous that it is possible to produce ultra-high-strength hot strip products with significantly improved properties with regard to toughness and isotropy; a good processability and in particular, a good weldability are present and in this case, it is possible to replace conventionally quenched and tempered sheets. This particularly concerns strips; an additional advantage is that it is possible to eliminate a component hardening or component quenching and tempering and that strips of this kind can also be subjected to inline heat treatment by means of ultrafast heating.

In the invention, the term "inline" is understood to mean that the entire heat treatment procedure takes place on the fly and it is advantageously possible to eliminate a separate manipulation of individual slabs.

The advantages become particularly clear when the conventional heat treatment is compared to the new short-term heat treatment.

In conventional hardening, the steel products are heated to above $A_{c3}$, e.g. 920° C., and are kept there for several minutes (e.g. 10 minutes) and are then subjected to accelerated cooling. In conventional quenching and tempering, after the hardening step, an annealing treatment is performed; the temperature is below $A_{c1}$, e.g. 570° C., and the annealing times are several minutes long (e.g. 15 minutes).

In the short-term heat treatment according to the invention, the hardening takes place e.g. at 950° C., but there is only, a one-second holding time for example, whereas in the quenching and tempering, the first heat treatment takes place at for example 950° C. for one second, for example, and the quenching and tempering step takes place at 650° C., for example, likewise for one second, for example.

Since for the mechanical properties, the heating rate one the one hand, but also the duration of the heat treatment particularly above the Ac3 point can exert an influence and can also be interchanged with each other in a predictable way (more time, lower temperature and vice versa) the Hollomon-Jaffee parameter (HJP), which maps the two influence variables, was developed for this purpose. The applicant subsequently developed this further in order to also be able to provide meaningful results for continuous heat treatment processes i.e. for the heating, the holding at a maximum temperature, and the cooling (Hubmer G., Ernst W., Klein M., Sonnleitner M., Spindler H.: A TRIBUTE TO HOLLOMON & JAFFE—THE 70TH BIRTHDAY OF A BRILLIANT EQUATION, Proc. 6th Int. Conf. on Modeling and Simulation of Metallurgical Processes in Steelmaking (STEELSIM 2015), Bardolino (2015)).

Particularly advantageous mechanical properties, especially for the product of notched bar impact work KV and tensile strength Rm, can result if the HJ Parameter of the hardening process is set to between 18000 and 23000, preferably between 18500 and 22000.

With the method according to the invention, it is possible to produce strips that have a particularly good combination of a high tensile strength Rm and high notched bar impact bending work KV, particularly at low temperatures. The product of Rm*KV can be >70,000 MPaJ, preferably >100,000 MPaJ, particularly preferably >150,000 MPaJ, and especially >200,000 MPaJ.

In general, it should be noted that the notched bar impact work KV was measured at −40° C.; it is to be expected that the value would have turned out to be even higher at a higher temperature.

The invention thus relates to a method for producing thermomechanically produced hot strip products; a steel alloy is melted; the steel alloy is adjusted so that a recrystallization during the hot rolling is suppressed; the melted steel alloy is cast into slab ingots and after being heated to a temperature above $Ac_3$, the slab ingots are hot rolled until they reach a desired degree of deformation and a desired strip thickness; after the rolling, the strip is cooled to room temperature and for hardening purposes, is briefly heated to a temperature >Ac3 and cooled again, characterized in that the heating takes place with a temperature increase of more than 5 K/s, preferably with more than 10 K/s, particularly preferably with more than 50 K/s, especially with more than 100 K/s and is kept at a desired target temperature for 0.5 to 60 s and then a cooling takes place.

Advantageously, a steel alloy is melted, which contains the following elements as well as iron and inevitable impurities, each expressed in wt %

0.03 to 0.22% carbon,
0.0 to 2.0% silicon,
0.5 to 3.0% manganese,
0.02 to 1.2% aluminum,
0 to 2.0% chromium,
0 to 2.0% nickel,
0.0 to 1.0% molybdenum,
0.0 to 1.5% copper,
0 to 0.02% phosphorus,
0 to 0.01% sulfur,
0 to 0.008% nitrogen,
0 to 0.005% boron,
0.0 to 0.2% niobium,
0.0 to 0.3% titanium,
0.0 to 0.5% vanadium
the remainder being comprised of iron and smelting-related impurities More preferably, a steel alloy is melted, which particularly contains the following elements as well as iron and inevitable impurities, each expressed in wt %

0.055 to 0.195 carbon,
0.0 to 0.3% silicon,
1.4 to 2.3% manganese,
0.02 to 0.6% aluminum,
0 to 2% chromium, 0 to 2% nickel,
0.0 to 0.42% molybdenum,
0.0 to 0.5% copper,
0 to 0.008% phosphorus,
0 to 0.0015% sulfur,
0 to 0.007% nitrogen
0 to 0.005% boron,
0.0 to 0.2% niobium,
0.0 to 0.3% titanium,
0.0 to 0.5% vanadium
the remainder being comprised of iron and smelting-related impurities It is advantageous if the brief heating can be carried out with all suitable forms of heating, e.g. inductive.

It is also advantageous if the target temperature in the brief heating for hardening purposes is >$Ac_3$, which means 800° C. to 1000° C., in particular 820° C. to 970° C.

It is particularly advantageous if the target temperature in the brief heating for annealing purposes is <$A_{c1}$, with the temperatures in particular being between 300° C. and 700° C.

In one embodiment of the invention, the holding times at the target temperature in the hardening and/or annealing and/or quenching and tempering are less than 5 seconds.

It can also be advantageous if the cooling after the heating step or steps takes place at cooling rates of >10° K/s.

In a modification of the invention, the cooling rate is >30K/s and in particular >60K/s.

In an alternative embodiment, direct hardening is performed from the rolling heat (DQ).

Advantageously, the strip or slabs can undergo inline hardening and/or annealing on the fly as part of the continuous process.

It is advantageous if after a welding of the produced materials, a short-term heat treatment is performed to homogenize the weld seam.

Advantageously, the sheet thickness is 1.5 mm to 20 mm, in particular 3 mm to 15 mm.

It is advantageous if the Hollomon-Jaffee parameter of the short-term hardening process is between 18000 and 22000.

The invention also relates to a hot strip produced with one of the above-mentioned methods in which at least one of the following mechanical properties
tensile strength (Rm)>=1000 MPa
notched bar impact bending work (KV)>=50 J
and the following condition is satisfied $$Rm \times KV >= 75000 \text{ MPa } J$$

The invention also relates to the use for producing cranes for stationary and mobile application on trucks and ships; armor and wear protection applications in the automotive sector; in trailers and semitrailers for trucks; and for automotive support structures and frames.

BRIEF DESCRIPTION OF THE DRAWINGS

The invention will be explained by way of example based on the drawings. In the drawings.

DETAILED DESCRIPTION OF THE INVENTION

According to the invention, steel is thermomechanically rolled in order to increase the properties of toughness and isotropy as well as other properties.

Figure 1:
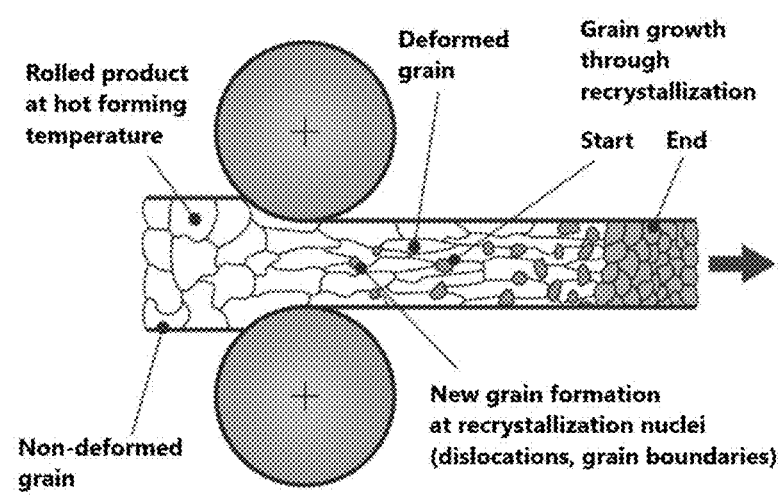
FIG. 1 shows the influence of conventional hot rolling on the structure.

According to FIG. 1, conventionally hot rolled steels, steels in which the rolled product is first heated to the hot-forming temperature and then rolled, by means of which the non-deformed grain is deflected in the rolling direction; already during the rolling, a recrystallization takes place after each roll pass, at the end of which the respective austenite grain has a globular form.

By contrast with this, thermomechanically rolled steels contain higher concentrations of carbide-forming elements, which form precipitation already during the hot rolling. The precipitation and the dissolved micro-alloying elements delay or suppress the recrystallization after the roll passes. Correspondingly, a recrystallization and a corresponding grain growth do not occur so that according to FIG. 2, a globular structure according to FIG. 1 is not formed and instead, the austenite is in an elongated form.

Figure 3:
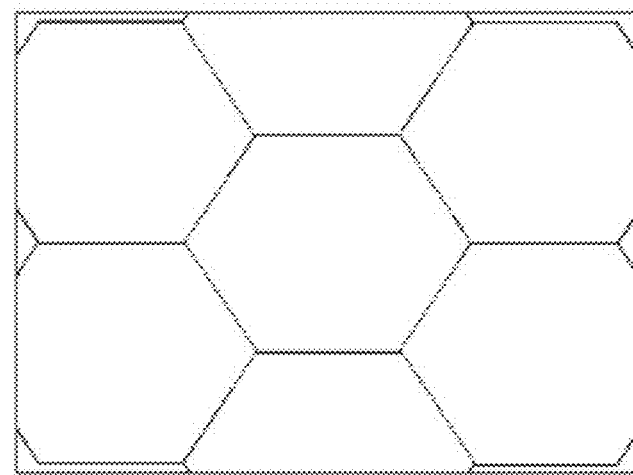
FIG. 3 shows the difference in the microstructure between recrystallized austenite and non-recrystallized austenite.
Figure 3:
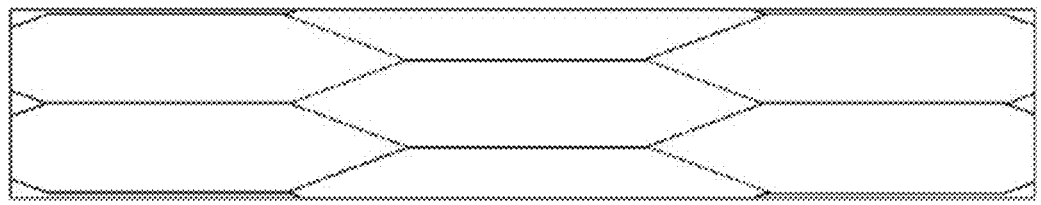

In FIG. 3 the different austenite embodiments are shown, on the one hand, the globular recrystallized austenite (top) and on the other, the elongated, non-recrystallized austenite (bottom).

The difference between the normalized rolled steels with the globular recrystallized austenite grain on the one hand and the thermomechanically rolled steels with the non-globular, elongated, and deformed austenite grain is that the austenite grain of the thermomechanically rolled steel exhibits a much finer structure after the transformation.

Correspondingly, the forming has significant effects on the structure and properties; the properties cannot be achieved by means of the heat treatment alone.

The thermomechanically rolled steels used are so-called micro-alloyed steels.

Figure 4:
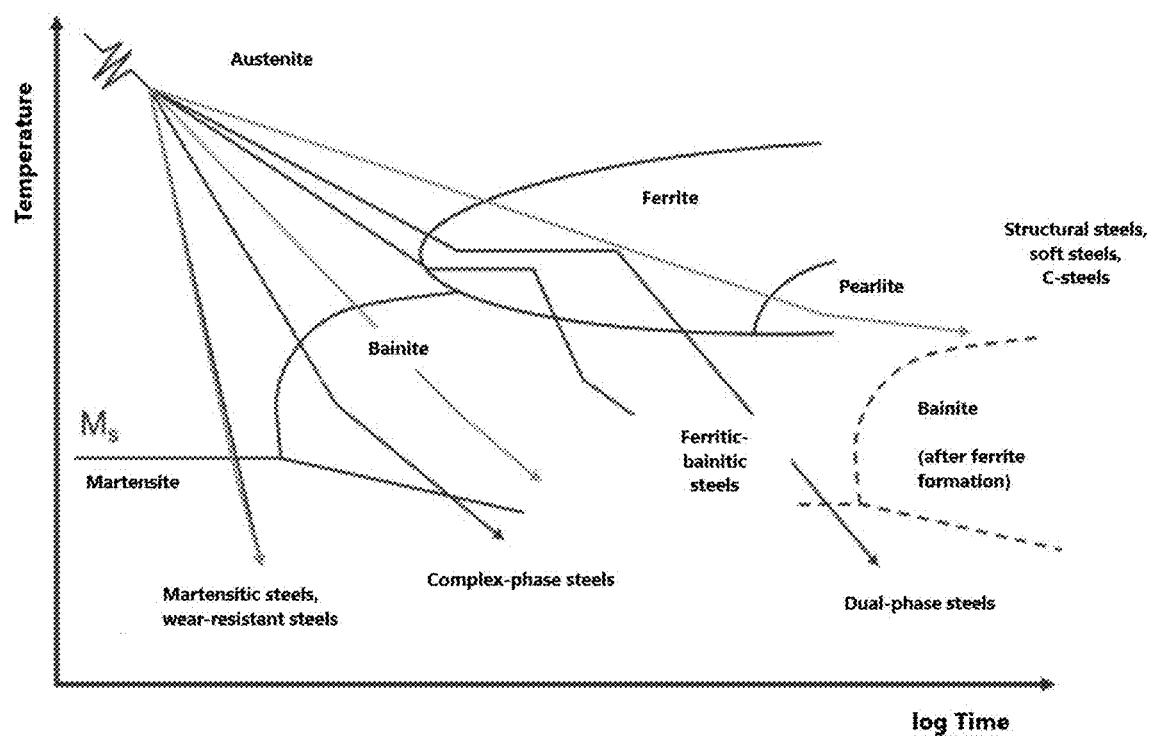
FIG. 4 shows the steel phases based on the temperature curves produced.

FIG. 4 schematically depicts how from the austenite range, by means of different cooling curves, it is also possible to achieve different structures or microstructures. It shows that by means of different cooling paths, martensitic steels, complex-phase steels, dual-phase steels, and ferritic-bainitic steels can be achieved.

Figure 5:
FIG. 5 shows the comparison of heat treatment routes in a thermomechanically rolled and conventionally quenched and tempered product, in a thermomechanically rolled product, and in a thermomechanically rolled product according to the invention.
Figure 5:
Figure 5:
Figure 5:
Figure 5:
Figure 5:
Figure 5:

Prior conventional heat treatment routes are shown in FIG. 5, lines 1 and 2. For example, the thermomechanical rolling and a conventional quenching and tempering step (a slab quenching and tempering), which is used for sheets, and the thermomechanical rolling, which can be combined with a direct hardening step (DQ) and an annealing step (A).

The method according to the invention (FIG. 5, last line) provides a thermomechanical rolling, an optional direct hardening (with an optional annealing step), and then at least one very short-term, for example inductive, hardening step or quenching and tempering step.

Figure 6A:
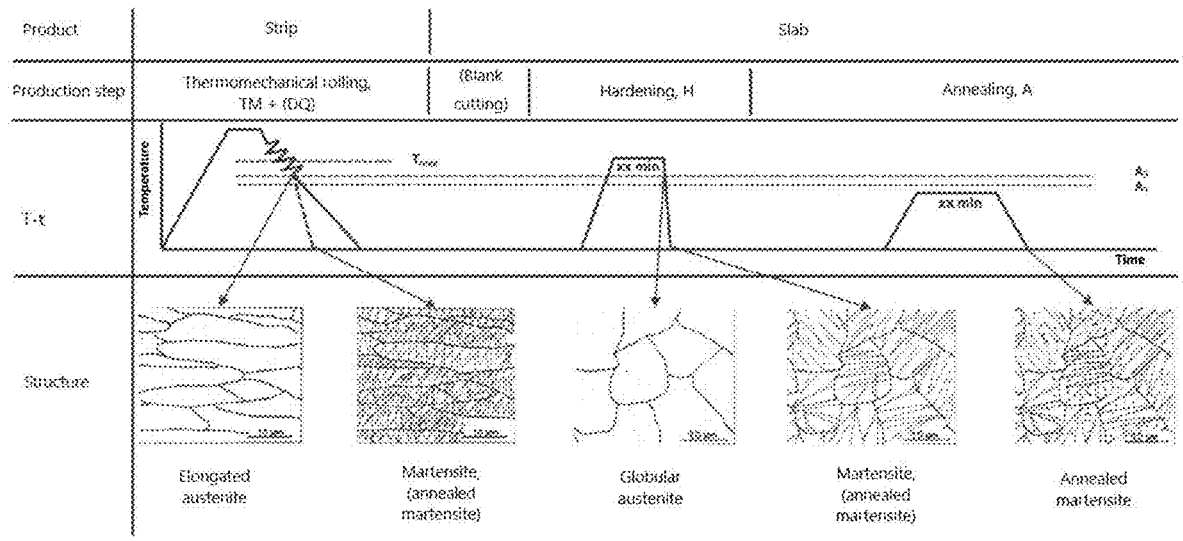
FIGS. 6*a*/6*b* show the temperature/time curves for the treatment routes in FIG. 5 that are not according to the invention and the structures that are finally established.
Figure 6B:
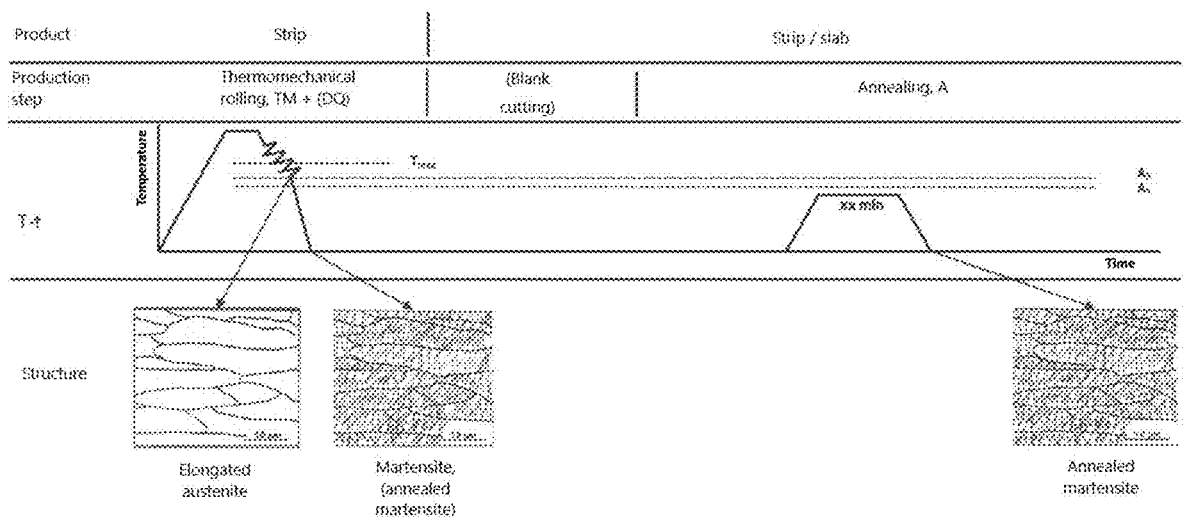

The temperature/time curves according to the prior art are shown in FIGS. 6a and 6b.

Before this short-term inductive hardening step or quenching and tempering step, the hot strip is allowed to cool or is cooled to room temperature (e.g. after the direct hardening). A further processing from the rolling heat does not take place.

Figure 10:
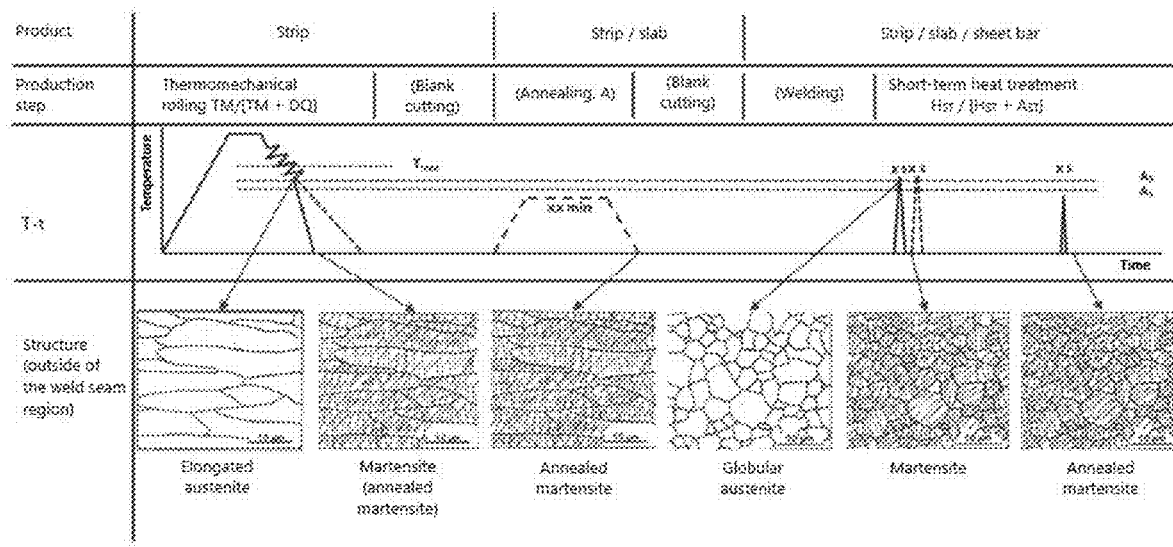
FIG. 10a shows the possible temperature/time curves in the method according to the invention with the structure that is established in the individual production steps.
FIG. 10b shows the possible temperature/time curves in the method according to the invention with the structure in welded connections that is established in the individual production steps.
Figure 10:
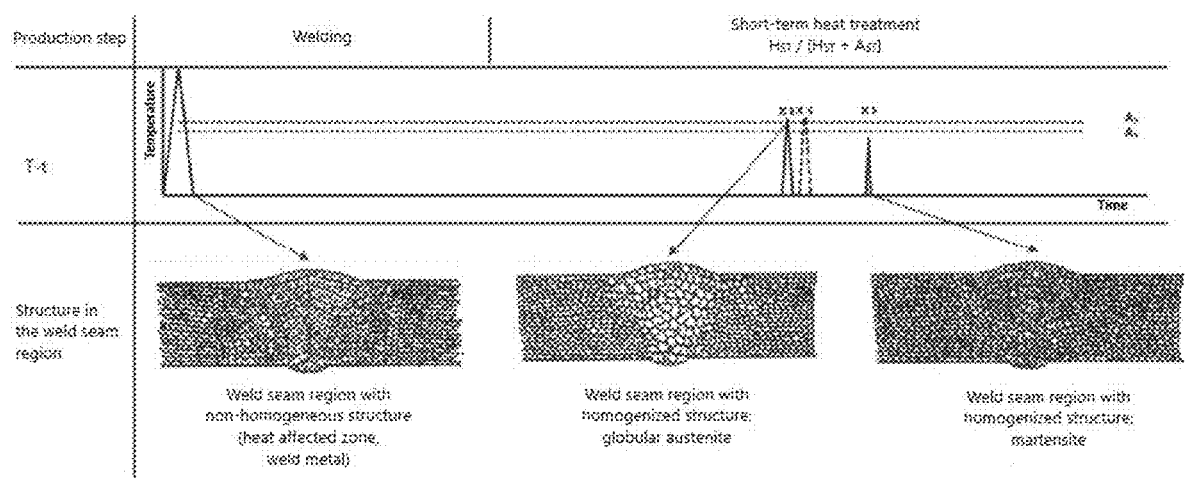

The differences in the structures are clear when known structures shown in FIG. 6a and FIG. 6b are compared to the structure produced according to the invention shown in FIG. 10a. The structure of the thermomechanically rolled and short-term heat-treated steel according to the invention differs significantly from the conventionally treated steels; the smaller size and more isotropic form of the grain structure are particularly conspicuous.

Basically, the quenching and tempering step should be explained once again; the conventional quenching and tempering step is shown in FIG. 6a. In the conventional quenching and tempering, a product is first heated in a reheating furnace and is then thermomechanically rolled and completely cooled.

After the quenching and tempering, it is heated again to approx. 900° C. and then a rapid cooling in water is performed, followed by an annealing step at approx. 600° C. with a subsequent cooling in air.

The conventional heat treatments that are not according to the invention are thus the conventional hardening (H) or slab hardening, the conventional quenching and tempering (H+A) or slab quenching and tempering, and the conventional annealing (A) in the form of slab annealing or bell annealing.

In the conventional hardening or quenching and tempering, it is only possible to treat piece goods, which is relatively costly. In conventional thermomechanical rolling, the elongation of the structure produces an anisotropy of the properties; a slab annealing can achieve very good strength/toughness ratios, but it is only possible to heat treat slabs and not strips.

The solution according to the invention provides a thermomechanically produced hot strip (TM+DQ), which results in an elongated austenite grain and a homogeneous carbon distribution in the microstructure.

By contrast with conventional methods, however, the subsequent heat treatments ($H_{ST}$, $A_{ST}$) are performed as short-term heat treatments.

By contrast with the prior art, in the heating according to the invention, as shown in the figures described above, a rapid short-term heating is performed; for example, the heat source can be an inductive heating, but does not have to be.

According to the invention, hardening can be performed at least once and annealing can optionally be performed once. This yields a globular, fine austenite grain with a maximized strength and a maximized toughness.

According to the invention, the hardening can be performed once or twice; at 100 K/s to 1000° K/s, the heating rates can be very high; the maximum temperature is set to >$Ac_3$. According to the invention, this temperature is 800° C. to 1000° C., in particular between 820° C. and 970° C. The holding time is extremely short compared to the prior art and can be from 0.5 to 60 seconds, in particular from 0.5 to 5 seconds.

According to the invention, however, the heating rate can also be lower and can, for example, be 5 K/s, 10 K/s, or 15 K/s.

Preferably, but necessarily, the low holding times can be from 0.5 to 60 seconds, more preferably 0.5 to 20 seconds, in particular 0.5 to 5 seconds.

The subsequent cooling rates are set anywhere from >10° K/s up to greater than 60° K/s.

The optional annealing is performed at a maximum temperature below $A_{c1}$, which is normally from 300° C. to 700°

C. In order to avoid a softening zone in subsequent welding processes, an annealing temperature of between 500° C. and 700° C. can be advantageous, but in order to increase the yield strength, a lower annealing temperature of 300° C. to 450° C. can be particularly advantageous.

The short-term heat treatments according to the invention are thus one the one hand hardening treatments or quenching and tempering treatments.

Figure 7:
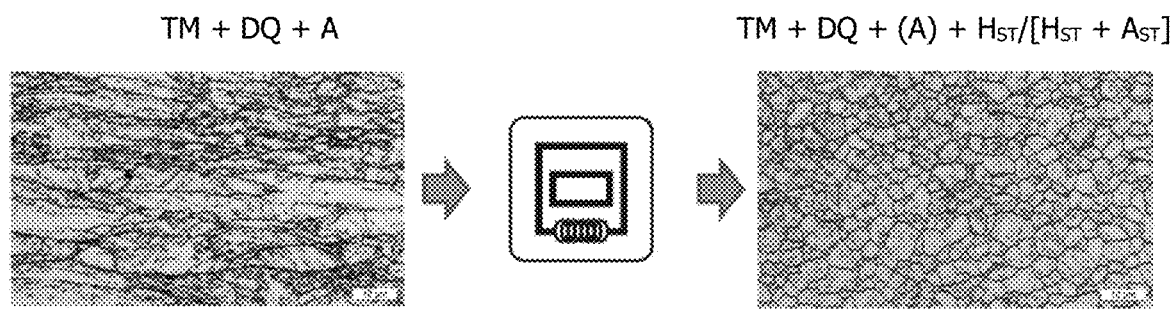
FIG. 7 shows a detail of the structure in a thermomechanically rolled and annealed steel after the short-term heat treatment according to the invention.

FIG. 7 shows that a thermomechanically rolled, directly hardened and annealed steel has an elongated structure, whereas the steel produced according to the invention (TM+DQ+A+$H_{ST}$/$H_{ST}$+$A_{ST}$) exhibits an isotropic globular structure.

This structure consists of 90% martensite (non-annealed or annealed), with the remainder being composed of austenite and bainite. The former austenite grain is globular, with the grain size being less than 20 μm and in particular less than 10 μm.

Figure 8:
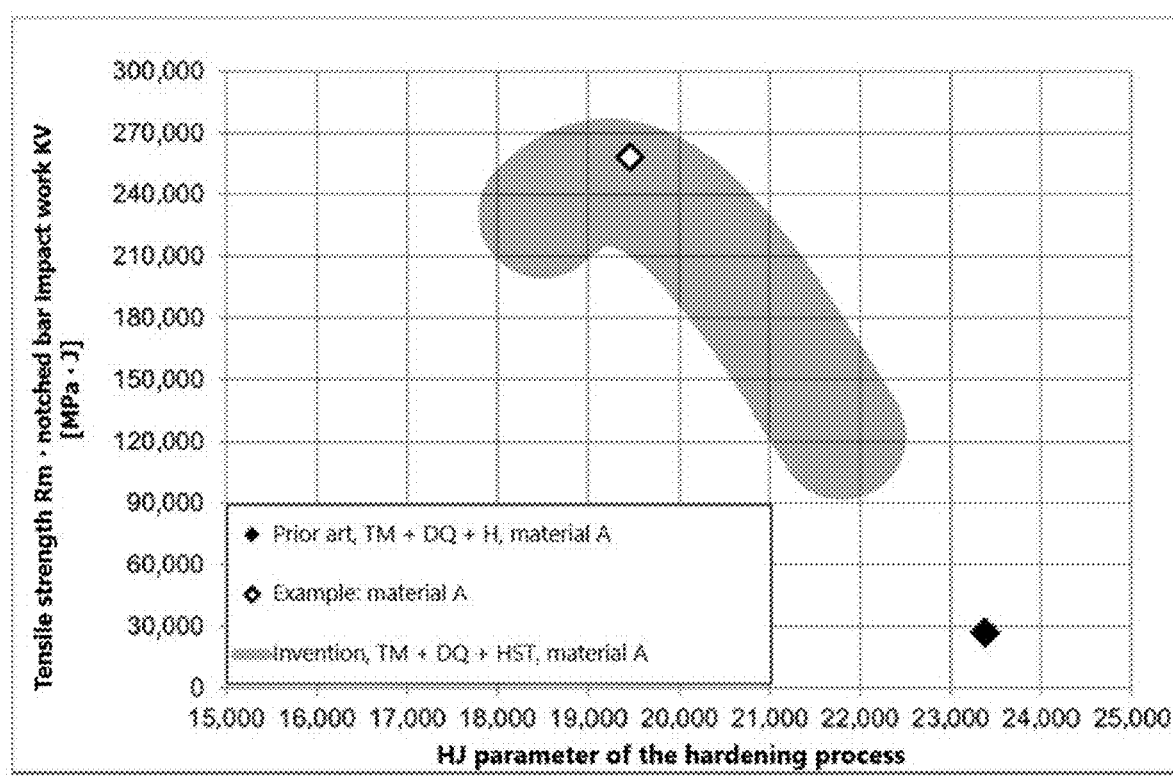
FIG. 8 shows the product of the tensile strength Rm and the notched bar impact work KV as a function of the Hollomon-Jaffee parameter of the hardening process for short-term hardening procedures according to the invention and for conventional hardening of the steel (material A in Table 1)
Figure 9:
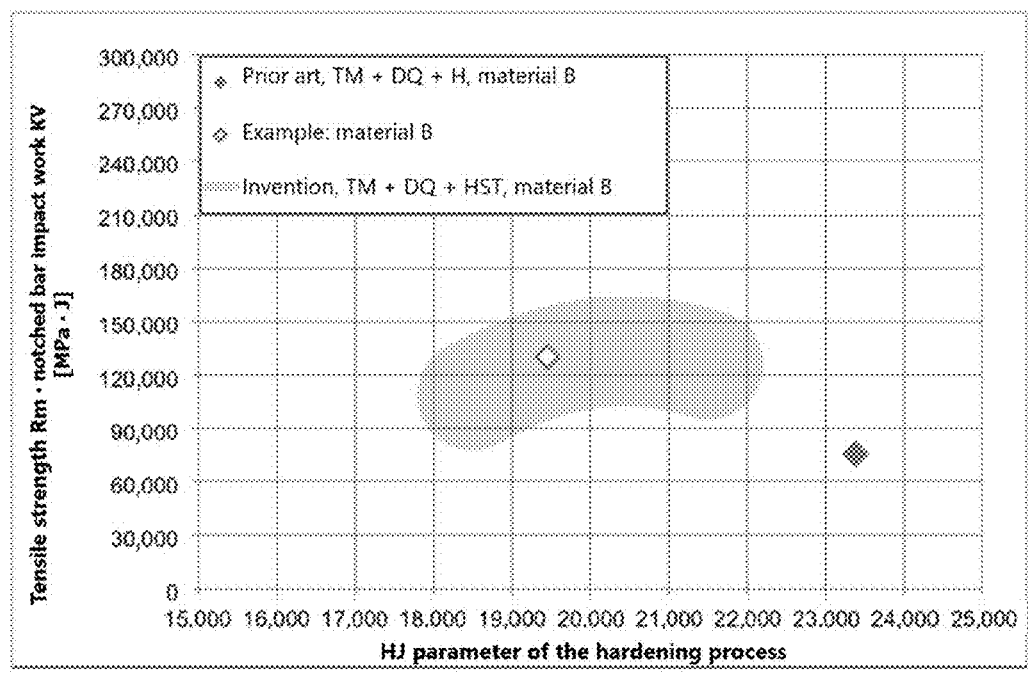
FIG. 9 shows the product of the tensile strength Rm and the notched bar impact work KV as a function of the Hollomon-Jaffee parameter of the hardening process for short-term hardening procedures according to the invention and for conventional hardening of the steel (material B in Table 2)

FIGS. 8 and 9 show examples of the properties that can be achieved as a function of the heat treatment routes and parameters for two respective alloy compositions A and B described in Tables 1 and 2 below. Table 1 shows selected properties of a steel (Material A) that has been heat treated according to the invention in contrast to conventionally heat treated steels. Table 2 shows selected propertied of a steel (Material B) that has been heat treated according to the invention in contrast to conventionally heat treated steels.

TABLE 1

Alloy Composition, Material A, Represented by FIG. 8

| Material | C | Si | Mn | P | S | Al | Cr | Ni | Mo | Cu | V | Nb | Ti | B | N |
|---|---|---|---|---|---|---|---|---|---|---|---|---|---|---|---|
| Material A | 0.09 | 0.12 | 1.64 | 0.008 | 0.001 | 0.051 | 0.92 | 0.47 | 0.22 | 0.02 | 0.11 | 0.002 | 0.026 | 0.0023 | 0.0051 |

| Material | | Production process | $R_{p.02}$ [MPa] | $R_m$ [MPa] | KV@ −40° C. [J] | Rm · KV@ −40° C. [MPa · J] |
|---|---|---|---|---|---|---|
| Material A | Prior art | TM + DQ + H<br>H: 920° C., 10', HJ = 23,380 | 907 | 1,174 | 23 | 27,002 |
| | | TM + DQ + H + A<br>H: 920° C., 10', A = 570° C., 35' | 879 | 934 | 23 | 21,482 |
| | Invention | TM + DQ + A | 983 | 1,013 | 53 | 53,689 |
| | | TM + DQ + (A) + $H_{ST}$<br>$H_{ST}$: 850° C., 3", HJ = 19,458 | 1,031 | 1,235 | 209 | 258,115 |
| | | TM + DQ + (A) + $H_{ST}$ + $A_{ST}$<br>$H_{ST}$: 850° C., 3", $A_{ST}$: 400° C., | 1,074 | 1,201 | 138 | 165,738 |
| | | TM + DQ + (A) + $H_{ST}$ + $A_{ST}$<br>$H_{ST}$: 850° C., 3", $A_{ST}$: 550° C., | 918 | 1,038 | 154 | 159,852 |

TABLE 2

Alloy Composition, Material B, Represented by FIG. 9

| Material | C | Si | Mn | P | S | Al | Cr | Ni | Mo | Cu | V | Nb | Ti | B | N |
|---|---|---|---|---|---|---|---|---|---|---|---|---|---|---|---|
| Material B | 0.18 | 0.29 | 1.44 | 0.008 | 0.001 | 0.052 | 0.73 | 1.02 | 0.39 | 0.46 | 0.04 | 0.038 | 0.020 | 0.0003 | 0.0051 |

| Material | | Production process | $R_{p.02}$ [MPa] | $R_m$ [MPa] | KV@ −40° C. [J] | Rm · KV@ −40° C. [MPa · J] |
|---|---|---|---|---|---|---|
| Material B | Prior art | TM + DQ + H<br>H: 920° C., 10', HJ = 23,380 | 1012 | 1371 | 55 | 75,405 |
| | | TM + DQ + H + A<br>H: 920° C., 10', A = 570° C., 35' | 1039 | 1064 | 44 | 46,816 |
| | Invention | TM + DQ + A | 1169 | 1213 | 46 | 55,798 |
| | | TM + DQ + (A) + $H_{ST}$<br>$H_{ST}$: 850° C., 3", HJ = 19,458 | 1269 | 1628 | 80 | 130,240 |
| | | TM + DQ + (A) + $H_{ST}$ + $A_{ST}$<br>$H_{ST}$: 850° C., 3", $A_{ST}$: 400° C., 1" | 1450 | 1480 | 50 | 74,000 |
| | | TM + DQ + (A) + $H_{ST}$ + $A_{ST}$<br>$H_{ST}$: 850° C., 3", $A_{ST}$: 550° C., 1" | 1280 | 1297 | 60 | 77,820 |

If a steel with the chemical composition shown in Table 1 is conventionally hardened, i.e. austenitized at 920° C. for 10 minutes, this yields an HJ parameter of 23380. The mechanical properties are an $R_{p0.2}$ of 907 MPa, $R_m$ of 1174 MPa, and a notched bar impact work KV of 23 joule. The product of Rm and KV is 27,002 MPaJ. If the same steel grade is quenched and tempered (austenitized again at 920° C. for 10 minutes and additionally annealed at 570° C. for 35 minutes), then the $R_{p0.2}$ is 879 MPa, the $R_m$ is 934 MPa, and the notched bar impact work is 23 joule. The product of Rm and KV is 21,482 MPaJ. In the thermomechanically rolled, directly hardened, and annealed production route, the mechanical characteristic values are 983 MPa for $R_{p0.2}$, 1013 MPa for $R_m$, and 53 joule for the notched bar impact bending work and the product Rm*KV=53,689 MPaJ.

By contrast, with the same material, but using the short-term heat treatment (HST) according to the invention with a holding step at 850° C. for 3 seconds and subsequent cooling to room temperature (HJ=19458), an $R_{p0.2}$ value of 1031 MPa with a tensile strength of 1235 MPa and a notched bar impact bending work of 209 joule are achieved. These extremely good mechanical properties yield a product of Rm*KV of 258,115 MPaJ and represent an almost ten-fold increase over the value according to the prior art.

Even with an additional short-term annealing (AST) after the hardening treatment and cooling to room temperature, for example at 400° C. for only 1 second, an $R_{p0.2}$ value of 1074 MPa is achieved with a simultaneously high tensile strength of 1201 MPa and a notched bar impact bending work of 138 joule (product 165,738 MPaJ). With an AST at 550° C. likewise maintained for one second, similar values are achieved; it being possible to slightly increase the notched bar impact bending work.

This means that it has been possible to achieve an extreme increase in the properties in all ranges.

In FIG. 9, the HJ parameter is plotted for different hardening temperatures and holding times. The light point corresponds to the above-described example A according to the invention with an HJ of 19,348 and the dark point corresponds to the comparison to the prior art. The HJ value should be above 18000 since otherwise, no hardening can be achieved, but must not be selected too high and in particular must be below 23000 since otherwise, the mechanical properties (especially the product of Rm and KV) can decrease drastically.

It is clear from Table 2 and from the comparison of the achievable values, though, that with a different alloy situation, the short-term heat treatment results in optimal combinations of properties.

In this case, different heat treatment temperatures were selected so that the quenching and tempering was performed once at 850° C. for 3 seconds and then at 550° C. for 1 second and after this, quenching and tempering was performed at 850° C. and at 400° C. for 1 second each. With the lower second short-term heat treatment, the notch impact strength does in fact decrease, but the values for $R_{p0.2}$ and Rm increase. Here, too, there is a clear relationship between a low HJ value and the good mechanical properties; this is not as dramatically pronounced with material B as it is with material A.

FIG. 9 once again shows the HJ parameter for heat treatments according to the invention compared to the prior art. FIG. 10a shows the temperature/time curve according to a possible embodiment of the invention together with the structures that are established.

First of all, it is clear that with the thermomechanical rolling, an elongated austenite grain is achieved, which is transformed by the direct hardening into a martensitic grain; optionally, an annealing treatment is performed.

By means of the possible short-term heat treatments, this grain, which is elongated and enriched with dislocations because of the thermomechanical treatment and direct hardening, is transformed into a fine, globular grain.

With the thermomechanical rolling according to the invention, in which the subsequent heat treatments are performed as short-term heat treatments, it is advantageous that a structure with improved properties is achieved; the short-term heat treatments also permit these heat treatment methods to be performed inline.

By means of the processing step or production step of welding, the introduced energy (heat and/or pressure) causes a local change in the structure and the mechanical properties. Products therefore have nonhomogeneous properties in the region of the weld seam.

If after production, the short-term heat treatment according to the invention is used after a processing step of "welding," then as shown in FIG. 10b for a fusion welding process, a homogenization of the microstructure occurs in the weld seam region. The microstructure of the weld seam region and also its mechanical properties are thus brought into line with those of the rest of the product.

This is true for both fusion-welded connections such as laser welds and for pressure-welded connections such as high-frequency welds.

The invention will be explained in greater detail based on an example:

The product according to the invention is produced in that first, a steel melt with the composition according to the invention, particularly the chemical composition indicated in Table 1 or Table 2, is melted in the steel mill and after the secondary metallurgical treatment, is cast into a slab ingot in a continuous casting machine.

Figure 2:
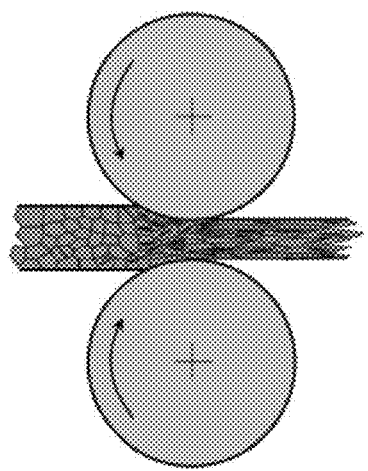
FIG. 2 shows the influence of the thermomechanical rolling on the structure.

The slab ingot is then heated to a temperature in the range from 1100° C. to 1300° C., in particular 1200° C. to 1260° C., descaled, and then thermomechanically hot rolled into a steel strip; in the hot rolling of the slab ingot, the initial rolling temperature is in the range from 1000° C. to 1250° C. and the final rolling temperature is greater than 800° C. and in particular, is between 830° C. and 930° C. In this case, a significant part of the forming takes place below the recrystallization stop temperature as a result of which, the austenite is elongated, as shown in FIG. 2. After the hot rolling, the steel strip is cooled from the final rolling temperature to the coiling temperature by means of water exposure and is coiled. In the present example, the coiling temperature is below the martensite start temperature, i.e. less than 500° C., in particular less than 250° C., and is achieved at a cooling rate of greater than 25° C./s, in particular between 40° C./s and 100° C./s.

The steel strip, with or without a preceding blank cutting (e.g. cross-cutting or longitudinal cutting), is optionally subjected to a heat treatment; the temperature assumes values below the A1 temperature, in particular below 700° C. Blanks made of the steel strip produced according to the invention can optionally be connected by means of a welding process. In this case, these blanks can have different dimensions or chemical compositions. According to the invention, the steel strip, the blank, or the welded blank is subjected to a short-term heat treatment. In this case, the product is first heated at least once to a maximum temperature above Ac3; typically, this is 800° C. to 1000° C., in particular however 820° C. to 970° C., briefly kept at this temperature, and then rapidly cooled. The heating rates, depending on the cross-section of the product to be heated, are greater than 5 K/s, preferably greater than 10 K/s, particularly preferably greater than 50 K/s, in particular greater than 100 K/s. The holding time at the maximum temperature is 0.5 to 60 seconds, for example 1-10 s; then, a cooling is performed at cooling rates between 10 K/s and up to greater than 60 K/s.

After the hardening, the material can be subjected to another annealing treatment. In the latter, the material is heated at a heating rate of up to 1000 K/s, in particular 400 to 800° C./s, to a maximum temperature below Ac1, which usually means 300° C. to 700° C., for example 550° C. The holding time at the maximum temperature is 0.5 to 60 seconds, for example 1 to 10 s; then, a cooling is performed at cooling rates between 10 K/s and up to greater than 60 K/s.

The invention will be explained in greater detail based on a specific example:

The product according to the invention is produced in that first, a steel melt with the composition according to the invention, in particular the chemical composition indicated in Table 1, is melted in the steel mill and after secondary metallurgical treatment, is cast into a slab ingot in a continuous casting machine.

The slab ingot is then heated to a temperature of 1220° C., descaled, and then conventionally hot-rolled into a steel strip; in the hot rolling of the slab ingot, the initial rolling temperature is 1100° C. and the final rolling temperature is 870° C. In this case, a significant part of the forming takes place below the recrystallization stop temperature as a result of which, the austenite is elongated, as shown in FIG. 2. After the hot rolling, the steel strip is cooled from the final rolling temperature to the coiling temperature by means of water exposure and is coiled. In the present example, the coiling temperature is 120° C. and is achieved at a cooling rate of 50° C./s.

According to the invention, a cut blank of the steel strip with a thickness of 4 mm is subjected to a short-term heat treatment. In this case, the product is initially heated to a maximum temperature above $Ac_3$, to 850° C. in the present example, is briefly held at this temperature, and is then rapidly cooled. The heating rate is 25 K/s.

The holding time at the maximum temperature is 3 seconds; finally, a cooling at a cooling rate of 140 K/s is performed. The Hollomon-Jaffee parameter of the short-term hardening that is performed is 19458.

The invention claimed is:

1. An inline, continuous method for producing thermo-mechanically produced hot-rolled strip products, comprising the steps of:
    providing a steel alloy including the following elements, in percent by weight:
    0.03 to 0.22% carbon,
    0.0 to 2.0% silicon,
    0.5 to 3.0% manganese,
    0.02 to 1.2% aluminum,
    0 to 2.0% chromium,
    0 to 2.0% nickel,
    0.0 to 1.0% molybdenum,
    0.0 to 1.5% copper,
    0 to 0.02% phosphorus,
    0 to 0.01% sulfur,
    0 to 0.008% nitrogen,
    0 to 0.005% boron,
    0.0 to 0.2% niobium,
    0.0 to 0.3% titanium,
    0.0 to 0.5% vanadium
    the remainder being comprised of iron and smelting-related impurities;
    melting the steel alloy;
    casting the melted steel alloy into slab ingots;
    heating the slab ingots to a temperature above Ac3,
    thermomechanically hot rolling the slab ingots using a final rolling temperature greater that 800° C. until they reach a desired degree of deformation and a reduced strip thickness and suppressing a recrystallization of the steel alloy during the hot rolling to form hot-rolled steel strips having a non-recrystallized elongated austenite structure;
    cooling the hot-rolled steel strips to room temperature; and
    after the cooling, hardening the hot-rolled steel strips by heating the hot-rolled steel strips to a target temperature >Ac3 and between about 800° C. and about 1000° C., and cooling the hot-rolled steel strips again to form hardened steel strips;
    wherein the heating of the hot-rolled steel strips is performed using a temperature increase of more than 5 K/s, and the hot-rolled steel strips are kept at the target temperature for a holding period of about 0.5 to about 60 seconds prior to cooling the hot-rolled steel strips again; and
    the hardened steel strips have a predominantly martensitic structure.

2. The method according to claim 1, wherein the steel alloy comprises the following elements in percent by weight:
    0.055 to 0.195 carbon,
    0.0 to 0.3% silicon,
    1.4 to 2.3% manganese,
    0.02 to 0.6% aluminum,
    0 to 2% chromium,
    0 to 2% nickel,
    0.0 to 0.42% molybdenum,
    0.0 to 0.5% copper,
    0 to 0.008% phosphorus,
    0 to 0.0015% sulfur,
    0 to 0.007% nitrogen
    0 to 0.005% boron,
    0.0 to 0.2% niobium,
    0.0 to 0.3% titanium,
    0.0 to 0.5% vanadium,
    the remainder being comprised of iron and smelting-related impurities.

3. The method according to claim 1, wherein the heating of the hot-rolled steel strips comprises inductive heating.

4. The method according to claim 1, further comprising the step of annealing the hardened steel strips at a temperature of about 300° C. to about 700° C.

5. The method according to claim 1, wherein the holding period is about 0.5 to about 10 seconds.

6. The method according to claim 1, wherein the step of cooling the hot-rolled steel strips to room temperature takes place at a cooling rate of >10 K/s.

7. The method according to claim 6, wherein the cooling rate is >30K/s.

8. The method according to claim 1, wherein the heating of the hot-rolled steel strips is performed using rolling heat.

9. The method according to claim 1, further comprising the steps of welding the hardened steel strips by forming a weld seam, and heat treating the welded steel strips to homogenize the weld seam.

10. The method according to claim 1, wherein the hardened steel strips have a sheet thickness of about 1.5 mm to about 20 mm.

11. The method according to claim 1, wherein the step of hardening the hot-rolled steel strips is performed using a Hollomon-Jaffe parameter of about 18000 to about 23000.

12. The method according to claim 1, wherein the hardened steel strips comprise at least one of the following mechanical properties:
tensile strength (Rm)>=1000 MPa, and
notched bar impact bending work (KV)>=50 J, measured at −40° C.,
and the following condition is satisfied:

$$Rm \times KV >= 75000 \text{ MPa-J.}$$

13. An inline, continuous method for producing thermomechanically produced hot-rolled strip products, comprising the steps of:
providing a steel alloy including the following elements, in percent by weight:
0.03 to 0.22% carbon,
0.0 to 2.0% silicon,
0.5 to 3.0% manganese,
0.02 to 1.2% aluminum,
0 to 2.0% chromium,
0 to 2.0% nickel,
0.0 to 1.0% molybdenum,
0.0 to 1.5% copper,
0 to 0.04% total of phosphorus, sulfur, nitrogen and boron,
0.0 to 1.0% total of niobium, titanium and vanadium,
the remainder being comprised of iron and smelting-related impurities;
casting the melted steel alloy into slab ingots;
heating the slab ingots to a temperature above Ac3;
thermomechanically hot rolling the slab ingots using a final rolling temperature greater that 800° C. until they reach a desired degree of deformation and a reduced strip thickness and suppressing a recrystallization of the steel alloy during the hot rolling to form hot-rolled steel strips having a non-recrystallized elongated austenite structure;
cooling the hot-rolled steel strips to room temperature;
after the cooling, hardening the hot-rolled steel strips by heating the hot-rolled steel strips to a target temperature >Ac3 and between about 800° C. and about 1000° C., and cooling the hot-rolled steel strips again to form hardened steel strips; and
annealing the hardened steel strips at a temperature below Ac1;
wherein the heating of the hot-rolled steel strips is performed using a temperature increase of more than 5 K/s, and the hot-rolled steel strips are kept at the target temperature for a holding period of about 0.5 to about 60 seconds prior to cooling the hot-rolled steel strips again; and
the hardened steel strips have a predominantly martensitic structure.

14. The method of claim 13, wherein the hot-rolled strip products have a tensile strength Rm in excess of 1000 MPa, a notched bar impact bending work (KV) in excess of 50 J at −40° C., and a Rm×KV in excess of 75000 MPa-J.

15. The method of claim 14, wherein the Rm multiplied by the notched bar impact bending work (KV) is at least about 165,000 MPa-J.

16. The method of claim 13, wherein the steel alloy comprises the following elements in percent by weight:
0.055 to 0.195 carbon,
0.0 to 0.3% silicon,
1.4 to 2.3% manganese,
0.02 to 0.6% aluminum,
0 to 2% chromium,
0 to 2% nickel,
0.0 to 0.42% molybdenum,
0.0 to 0.5% copper,
0 to 0.008% phosphorus,
0 to 0.0015% sulfur,
0 to 0.007% nitrogen
0 to 0.005% boron,
0.0 to 0.2% niobium,
0.0 to 0.3% titanium,
0.0 to 0.5% vanadium
the remainder being comprised of iron and smelting-related impurities.

17. An inline, continuous method for producing thermomechanically produced hot-rolled strip products, comprising the steps of:
providing a steel alloy including the following elements, in percent by weight:
0.03 to 0.22% carbon,
0.0 to 2.0% silicon,
0.5 to 3.0% manganese,
0.02 to 1.2% aluminum,
0 to 2.0% chromium,
0 to 2.0% nickel,
0.0 to 1.0% molybdenum,
0.0 to 1.5% copper,
0 to 0.04% total of phosphorus, sulfur, nitrogen and boron,
0.0 to 1.0% total of niobium, titanium and vanadium,
the remainder being comprised of iron and smelting-related impurities;
casting the melted steel alloy into slab ingots;
heating the slab ingots to a temperature above Ac3,
thermomechanically hot rolling the slab ingots using a final rolling temperature greater that 800° C. until they reach a desired degree of deformation and a reduced strip thickness and suppressing a recrystallization of the steel alloy during the hot rolling to form hot-rolled steel strips having a non-recrystallized elongated austenite structure;
cooling the hot-rolled steel strips to room temperature; and
after the cooling, hardening the hot-rolled steel strips by heating the hot-rolled steel strips to a target temperature >Ac3 and between about 800° C. and about 1000° C., and cooling the hot-rolled steel strips again to form hardened steel strips;
wherein the heating of the hot-rolled steel strips is performed using a temperature increase of more than 5 K/s, and the hot-rolled steel strips are kept at the target temperature for a holding period of about 0.5 to about 60 seconds prior to cooling the hot-rolled steel strips again; and
the hardened steel strips have a predominantly martensitic structure, a tensile strength Rm in excess of 1000 MPa, a notched bar impact bending work (KV) in excess of 50 J at −40° C., and a Rm×KV in excess of 75000 MPa-J.

18. The method of claim 17, wherein the Rm multiplied by the notched bar impact bending work (KV) is at least about 165,000 MPa-J.

19. The method of claim 17, wherein the steel alloy comprises the following elements in percent by weight:
0.055 to 0.195 carbon,
0.0 to 0.3% silicon,
1.4 to 2.3% manganese,
0.02 to 0.6% aluminum,
0 to 2% chromium, 0 to 2% nickel,
0.0 to 0.42% molybdenum,
0.0 to 0.5% copper,
0 to 0.008% phosphorus,
0 to 0.0015% sulfur,
0 to 0.007% nitrogen
0 to 0.005% boron,
0.0 to 0.2% niobium,
0.0 to 0.3% titanium,
0.0 to 0.5% vanadium,
the remainder being comprised of iron and smelting-related impurities.

* * * * *